United States Patent
Bernett

(10) Patent No.: US 6,683,747 B2
(45) Date of Patent: Jan. 27, 2004

(54) INTERNAL DISC DRIVE GAS RESERVOIR

(75) Inventor: Frank William Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 211 days.

(21) Appl. No.: 10/071,004

(22) Filed: Feb. 7, 2002

(65) Prior Publication Data

US 2003/0081349 A1 May 1, 2003

Related U.S. Application Data

(60) Provisional application No. 60/338,210, filed on Nov. 1, 2001.

(51) Int. Cl.[7] .............................................. G11B 17/02
(52) U.S. Cl. .................................................... 360/97.02
(58) Field of Search ............................ 360/97.02, 97.03

(56) References Cited

U.S. PATENT DOCUMENTS

| | | | |
|---|---|---|---|
| 2,141,894 A | 12/1938 | Alexanderson | |
| 2,259,129 A | 10/1941 | Engster | |
| 4,367,503 A | 1/1983 | Treseder | 360/98 |
| 4,488,192 A | 12/1984 | Treseder | 360/98 |
| 4,556,969 A | 12/1985 | Treseder et al. | 369/291 |
| 5,293,286 A | 3/1994 | Hasegawa et al. | 360/97.02 |
| 5,454,157 A | 10/1995 | Ananth et al. | 29/603 |
| 6,144,178 A | 11/2000 | Hirano et al. | 318/476 |
| 6,317,286 B1 | 11/2001 | Murphy et al. | 360/97.02 |
| 6,417,987 B1 * | 7/2002 | Khan et al. | 360/97.02 |
| 6,433,957 B1 * | 8/2002 | Rudd et al. | 360/97.02 |
| 6,560,064 B1 * | 5/2003 | Hirano | 360/97.02 |

* cited by examiner

Primary Examiner—Robert S. Tupper
(74) Attorney, Agent, or Firm—Merchant & Gould P.C.

(57) ABSTRACT

A system for boosting a concentration of a gas other than air, such as helium, within an enclosed disc drive environment includes a pressurized reservoir of the gas other than air within the disc drive environment. The gas other than air flows from the reservoir through an outlet and into the disc drive environment. Additionally, a particle trap within the disc drive environment traps air particles.

23 Claims, 3 Drawing Sheets

INTERNAL DISC DRIVE GAS RESERVOIR

RELATED APPLICATIONS

This application claims priority of United States provisional application Serial No. 60/338,210, filed Nov. 1, 2001.

FIELD OF THE INVENTION

This application relates generally to disc drives and more particularly to a system for boosting the concentration of a gas other than air within a disc drive.

BACKGROUND OF THE INVENTION

A disc drive typically includes a base to which various components of the disc drive are mounted. A top cover cooperates with the base to form a housing that defines an internal clean environment for the disc drive. Sealing and filling the clean environment of disc drives with gases other than air can enhance their performance. For example, low-density inert gases such as helium can reduce the aerodynamic drag between the discs and their associated read/write heads by a factor of approximately five-to-one compared to operating in air. This reduced drag results in reduced power requirements for the spindle motor. A helium filled drive thus uses substantially less power than a comparable disc drive that operates in an air environment Despite the advantages of helium filled drives, such drives have not been commercially successful. This is mainly due to problems associated with the helium leaking from the disc drives over time. As the helium leaks out, air leaks in causing undesirable effects in the operation of the disc drives and possibly causing the disc drives to fail. For example, the increased concentration of air may increase the forces on the read/write head due to turbulent airflow within a drive and it may cause noise and/or the heads to fly at too great a distance above the discs.

Accordingly, there is a need for an improved system that can effectively boost the concentration of a gas other than air, such as helium, in a disc drive during use. The present invention provides a solution to this and other problems, and offers other advantages over the prior art.

SUMMARY OF THE INVENTION

Against this backdrop the present invention has been developed. An embodiment of the present invention is a system for boosting a concentration of a gas other than air, such as helium, within an enclosed disc drive environment. The system includes a pressurized reservoir of the gas other than air within the disc drive environment. The gas other than air flows from the reservoir through an outlet and into the disc drive environment. Additionally, a particle trap within the disc drive environment traps air particles.

In one embodiment, the outlet is a diaphragm through which the gas other than air diffuses into the disc drive environment. In another embodiment, a pressure sensor connected to the disc drive environment is able to produce a pressure signal representative of the disc drive environment pressure. A control module receives the pressure signal and supplies the gas other than air from the reservoir to the disc drive environment if the pressure within the disc drive environment is within a predetermined pressure range. The control module ceases supplying the gas other than air from the reservoir to the disc drive environment if the pressure within the disc drive environment is above the predetermined pressure range.

Another embodiment of the present invention is a disc drive defining an enclosed disc drive environment. The disc drive includes a system for boosting a concentration of a gas other than air, such as helium, within an enclosed disc drive environment. The system includes a pressurized reservoir of the gas other than air within the disc drive environment. The gas other than air flows from the reservoir through an outlet and into the disc drive environment. Additionally, a particle trap within the disc drive environment traps air particles.

These and various other features as well as advantages which characterize the present invention will be apparent from a reading of the following detailed description and a review of the associated drawings.

DETAILED DESCRIPTION

Figure 1:
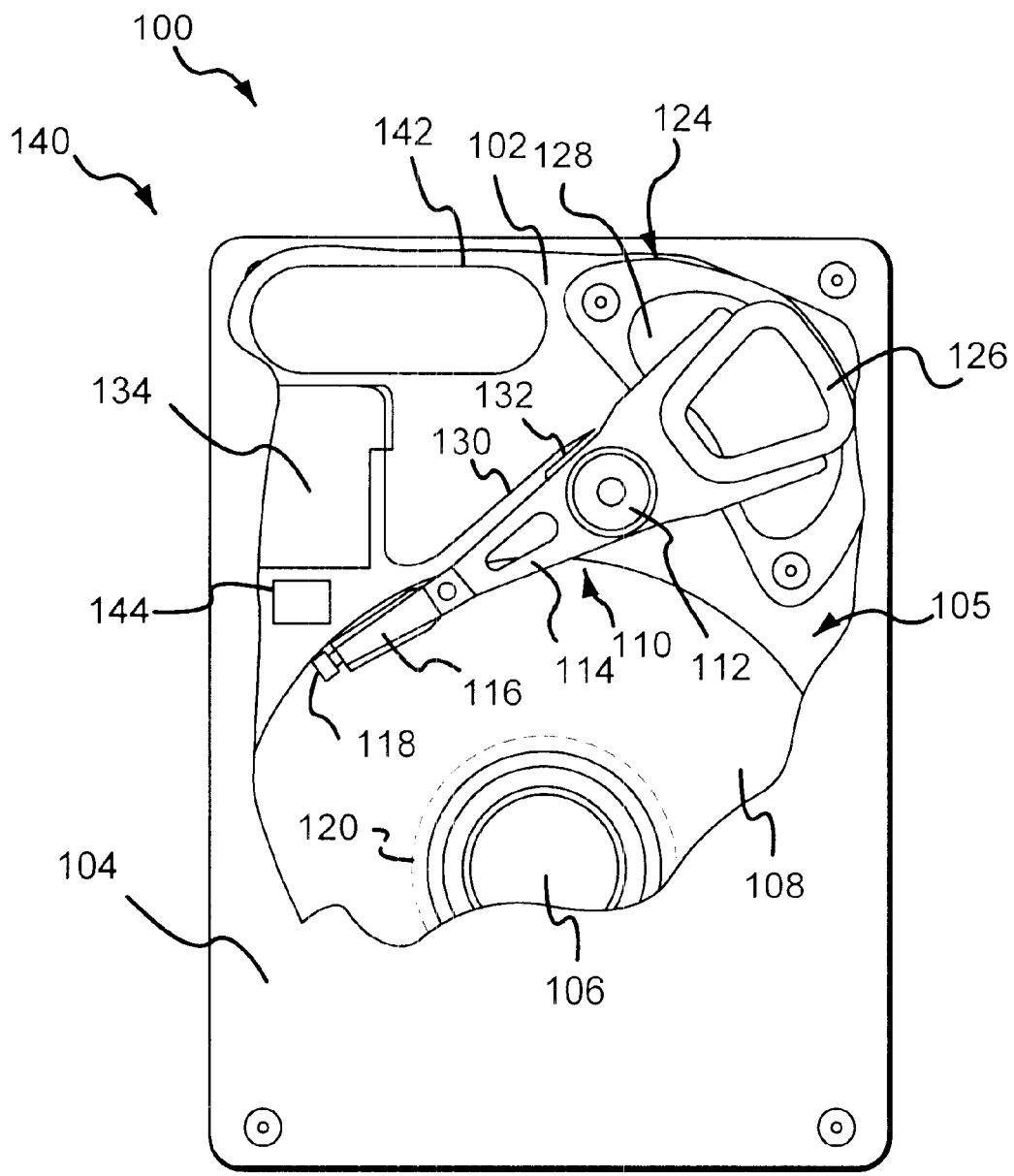
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing that defines an enclosed sealed environment or disc drive environment 105 for the disc drive in a conventional manner. The disc drive environment 105 is filled with helium to enhance the performance of the disc drive 100.

The components of the disc drive 100 include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114, which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

A concentration boosting system 140 boosts the concentration of a gas other than air within the disc drive environment 105. The concentration boosting system 140 includes a supply system 142 within the disc drive environment 105. The concentration boosting system 140 also includes a trapping system 144 that traps air particles within a predetermined area of the disc drive 100. Thus, over the life of the disc drive 100 the supply system 142 replaces gas other than air that has leaked out, and the trapping system 144 effectively removes air from the disc drive environment as the air leaks in by trapping it in a predetermined area. The concentration boosting system 140 thus boosts the concentration in the disc drive environment 105 by increasing the amount of the gas other than air and decreasing the amount of air. The concentration boosting system 140 thereby extends the useful life of the disc drive 100.

Figure 2:
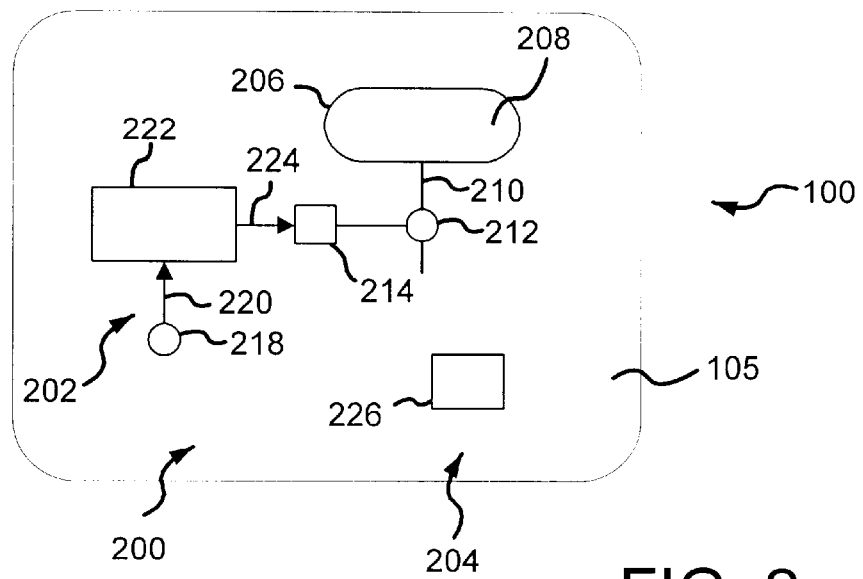
FIG. 2 is a schematic diagram of a preferred disc drive concentration boosting system in accordance with a preferred embodiment of the present invention.

Referring now to FIG. 2, a concentration boosting system 200 in accordance with an embodiment of the present invention includes a supply system 202 and a trapping system 204. The supply system 202 includes a container 206 that defines a reservoir 208 containing the gas other than air. The reservoir 208 is preferably pressurized to an initial pressure of from about 60 atmospheres to about 100 atmospheres absolute pressure. The container 206 is preferably a sealed metal container, such as an aluminum or steel container. It may be similar in construction to other sealed pressurized containers, such as carbon dioxide cartridges. In an embodiment of the present invention, the reservoir 208 has a volume that is about 10% of the volume of the disc drive environment 105.

An exit line 210 extends from the reservoir 208. The exit line 210 is preferably a small hole extending through a wall of the container 206. A valve 212 is normally closed to prevent gas from leaking from the reservoir 208 through the exit line 210. An actuator 214 is connected to the valve 212 and is operable to open and close the valve 212. In an embodiment of the present invention, the valve 212 may include a bimetallic strip located within the container 206 that normally plugs the hole 210, and the actuator 214 includes a coil mounted on the bimetallic strip. When a current runs through the coil, the coil heats the bimetallic strip, causing the bimetallic strip to deform and allowing the pressurized gas to enter the hole 210. However, many other valve-actuator combinations are possible. For example, the valve could be a micro-machined valve.

A pressure sensor 218 emits a pressure signal 220 that represents the pressure within the disc drive environment 105. A control module 222 receives the pressure signal 220. The control module 222 produces a valve actuator signal 224 that prompts the actuator 214 to open the valve 212 when the pressure signal 220 indicates that the pressure within the disc drive environment 105 is within a predetermined pressure range. The gas other than air then flows from the reservoir 208, through the exit line 210, and into the disc drive environment 105. After the pressure within the disc drive environment 105 rises above the predetermined pressure range, the control module 222 prompts the actuator 214 to close the valve 212. The predetermined pressure range is preferably at or slightly above ambient atmospheric pressure for drive operation, although other ranges may be used depending on the vacuum and/or pressure handling capability of the drive enclosure.

The valve 212, the valve actuator 214, the pressure sensor 218 and the control module 222 may all be included in a pressure regulator arrangement designed to maintain a constant pressure or pressure range within the disc drive environment 105. In that case, the pressure signal could be an electrical, pneumatic, or mechanical signal within the pressure regulator.

The trapping system 204 preferably includes a particle trap 226 that traps air particles, which may include gaseous and solid air particles. In an embodiment of the present invention the particle trap 226 is a getter (a device that chemically reacts with air particles that have entered the disc drive environment 105). When the gas other than air is helium, the getter preferably reacts with nitrogen and oxygen molecules to confine them to a predetermined area of the getter. In an embodiment of the present invention, the getter is a 5M1045 Combo Getter available from SAES Getters S.p.A. of Lainate Italy. Alternatively, the particle trap 226 may be a filter system that traps oxygen and nitrogen molecules or a gas flow separation system that separates heavier molecules, such as oxygen and nitrogen molecules, from lighter molecules, such as helium molecules.

Figure 3:
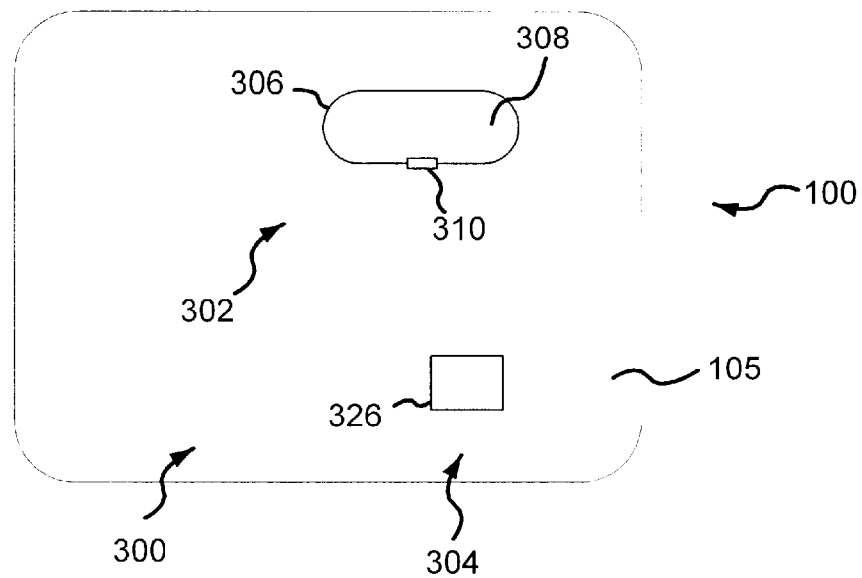
FIG. 3 is a schematic diagram of an alternative disc drive concentration boosting system in accordance with a preferred embodiment of the present invention.

Referring now to FIG. 3, an alternative concentration boosting system 300 is shown that uses gas diffusion to regulate release of the gas other than air into the disc drive environment 105. This system 300 also includes a supply system 302 and a trapping system 304. The supply system 302 includes a container 306 that defines a reservoir 308. The container 306 can be similar in construction to the container 206 described above except that here the initial pressure should be within a range of about 5 atmospheres to about 10 atmospheres absolute pressure. The supply system 302 includes a diaphragm 310 that separates the reservoir 308 from the disc drive environment 105. The diaphragm 310 preferably is constructed so that the gas other than air will continuously diffuse from the reservoir 308, through the diaphragm 310, and into the disc drive environment 105. The diffusion rate will vary with the pressure difference between the reservoir 308 and the disc drive environment 105. Thus, as the reservoir pressure decreases, the diffusion rate will also decrease. In an embodiment of the present invention the diaphragm 310 is a glass plug seated within a wall of the container 306. The trapping system 304 includes a particle trap 326 that is similar to the particle trap 226 described above.

The concentration boosting system 300 works in a manner similar to the concentration boosting system 200. However, rather than maintaining a predetermined pressure or pressure range within the disc drive environment 105 by intermittently supplying gas other than air through a valve, the supply system 302 continuously diffuses the gas other than air through the diaphragm 310.

Figure 4:
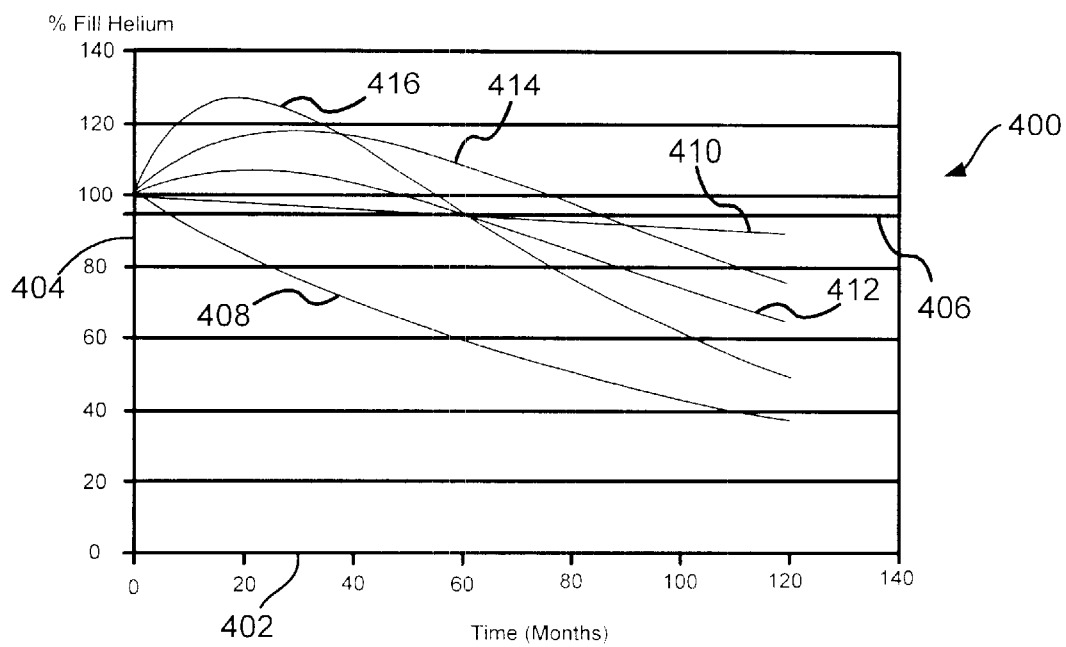
FIG. 4 is a graph comparing the percentage fill of helium over time for various disc drive configurations, some of which include helium concentration boosting systems in accordance with embodiments of the present invention.

Referring now to FIG. 4, a graph 400 compares the percent fill of helium over time (months) for various configurations in a diffusion concentration boosting system 300 in accordance with the present invention. The horizontal axis 402 represents time and the vertical axis 404 represents percent fill of helium. The percent fill of helium here represents the quantity of helium in the disc drive environment 105 compared to an initial quantity. In each example, the initial pressure of the disc drive environment 105 was at 1 atmosphere absolute. A critical value line 406 represents the quantity of helium necessary for the disc drive 100 to operate properly. In the present examples, the critical value line 406 is at 95% of the initial value, but it will vary depending on the initial concentration of helium and on the features of the specific disc drive 100. In all the exemplary configurations of FIG. 4, the volume of the disc drive environment 105 is 100 cc's.

A first line 408 represents the percent fill of helium over time for a disc drive environment 105 with a leak rate of $3.5 \times 10^{-7}$ cc's per second, which is a typical upper limit of the leak rate for a rubber gasket used to seal a disc drive 100. A second line 410 represents the percent fill of helium over time for a disc drive environment 105 with a leak rate of $3.5 \times 10^{-8}$ cc's per second, which is a typical lower limit of the leak rate for a rubber gasket used to seal a disc drive 100. As can be seen by these two lines 408, 410, a typical disc drive 100 using a typical rubber gasket would be operational for somewhere between about 6 months and about 55 months. For most disc drive applications, this is insufficient.

A third line 412 represents the percent fill of helium over time for a disc drive environment 105 that encloses a diffusion-type concentration boosting system 300 with a 10 cc reservoir at an initial reservoir pressure of 7.5 atmospheres absolute. Even if the disc drive environment 105 leaks at a rate of $3.5 \times 10^{-7}$ cc's per second (typical upper limit for a normal rubber gasket), the disc drive is operational for about 60 months, rather than 6 months.

A fourth line 414 represents the percent fill of helium over time for a disc drive environment 105 that encloses a diffusion-type concentration boosting system 300 with a 10 cc reservoir, this time at an initial reservoir pressure of 10 atmospheres absolute for a disffusion type boosting system. Even if the disc drive environment 105 leaks at a rate of $3.5 \times 10^{-7}$ cc's per second (typical upper limit for a normal rubber gasket), the disc drive is operational for about 85 months, rather than about 6 months.

A fifth line 416 represents the percent fill of helium over time for a disc drive environment 105 that encloses a diffusion-type concentration boosting system 300 with a 10 cc reservoir at an initial reservoir pressure of 10 atmospheres absolute. Even if the disc drive environment 105 leaks at a rate of $5 \times 10^{-7}$ cc's per second, which is above the typical upper limit for a normal rubber gasket, the disc drive 100 is operational for about 60 months.

As can be seen from FIG. 4 and the preceding discussion, a concentration boosting system 200 or 300 according to the present invention significantly increases the useful life of a disc drive 100 filled with helium or some other non-air gas.

Figure 5:
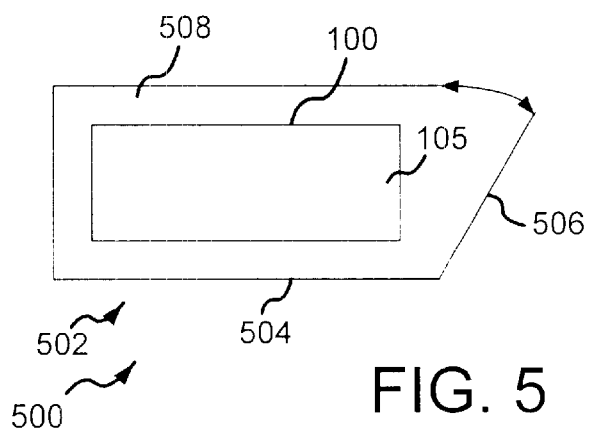
FIG. 5 is a schematic diagram of a disc drive shipping or storage package according to an embodiment of the present invention.

Referring to FIG. 5, in an embodiment of the present invention the disc drive 100 is shipped and/or stored within a shipping package 500 to prevent significant leakage of helium from the disc drive environment 105 of the disc drive 100 before the disc drive 100 is used. The shipping package 500 includes a container 502 that contains a disc drive 100. The container 502 includes a body 504 and a door or lid 506 that spans an aperture in the body 504 to seal the container 502. The container 502 thus defines an external enclosed environment 508. The external enclosed environment 508 is also filled with the gas other than air. The external enclosed environment 508 will prevent significant leakage or diffusion of air into the internal disc drive environment 105 of the disc drive 100. The body 504 and the lid 506 are preferably composed of a metal such as aluminum. They are preferably sealed together by welding, brazing or soldering. If the body 504 and the lid 506 are welded together, the lid 506 or the body 504 can include a thinned portion that will readily allow a user to create an opening to remove the disc drive 100 from the container 502.

Alternatively described, an embodiment of the present invention is a boosting system (such as 200 or 300) for boosting a concentration of a gas other than air within an enclosed disc drive environment (such as 105) containing a disc (such as 108). The boosting system includes a reservoir (such as 208 or 308) within the disc drive environment, which contains contains the gas other than air at a reservoir pressure that is higher than a disc drive environment pressure of the disc drive environment. The gas other than air flows through an outlet (such as 210 or 310) from the reservoir to the disc drive environment. The boosting system also includes a particle trap (such as 226 or 326) within the disc drive environment for trapping air particles.

In one embodiment of the present invention, the outlet is a diaphragm (such as 310) through which the gas other than air diffuses into the disc drive environment.

In another embodiment of the present invention, the boosting system further includes a pressure sensor (such as 218) connected to the disc drive environment. The sensor is able to produce a pressure signal representative of the disc drive environment pressure. In this embodiment, the boosting system also includes a control module (such as 222) that receives the pressure signal and supplies the gas other than air from the reservoir to the disc drive environment if the disc drive environment pressure is within a predetermined pressure range. The control module ceases from supplying the gas other than air from the reservoir to the disc drive environment if the pressure within the disc drive environment is above the predetermined pressure range. The predetermined pressure range may be at about ambient atmospheric pressure. In one embodiment of the present invention the predetermined pressure range is above ambient atmospheric pressure. The control module may supply the gas other than air from the reservoir to the disc drive environment by opening a valve (such as 212) that is connected to the reservoir, and it may cease from supplying the gas other than air from the reservoir to the disc drive environment by closing the valve.

Alternatively, in a diffusion type embodiment of the boosting system, the reservoir pressure may drop from an initial pressure as the gas other than air flows from the reservoir by diffusion to the disc drive environment. That initial pressure is preferably from about 5 atmospheres to about 10 atmospheres in the diffusion embodiment.

The particle trap preferably confines trapped particles to a predetermined area within the disc drive environment. In one embodiment of the present invention, the particle trap is a getter that chemically reacts with the trapped air particles. The trapped air particles are preferably nitrogen and oxygen molecules. The gas other than air is preferably helium.

Another an embodiment of the present invention may be summarized as a disc drive (such as 100) defining an enclosed disc drive environment (such as 105). The discdrive includes a boosting system (such as 200 or 300) for boosting a concentration of a gas other than air within the disc drive environment. The boosting system includes a reservoir (such as 208 or 308) within the disc drive environment, and the reservoir contains the gas other than air at a reservoir pressure that is higher than a disc drive environment pressure of the disc drive environment. The gas other than air flows from the reservoir to the disc drive environment through an outlet (such as 210 or 310). The boosting system also includes a particle trap (such as 226 or 326) within the disc drive environment for trapping air particles.

An embodiment of the present invention may also be summarized as a disc drive (such as 100) including an enclosed disc drive environment (such as 105) and means within the disc drive environment for boosting a concentration of a gas other than air within the disc drive environment. The means for boosting may include means for supplying helium to the disc drive environment and means for trapping air particles within the disc drive environment.

It will be clear that the present invention is well adapted to attain the ends and advantages mentioned as well as those inherent therein. While embodiments have been described for purposes of this disclosure, various changes and modifications may be made which are well within the scope of the present invention. For example, the helium reservoir can be placed in any of various positions within the drive and can be any of various shapes depending on the type of drive and the desired size of the helium reservoir. Numerous other changes may be made which will readily suggest themselves to those skilled in the art and which are encompassed in the scope of the invention disclosed and as defined in the appended claims.

What is claimed is:

1. A boosting system for boosting a concentration of a gas other than air within an enclosed disc drive environment containing a disc, the boosting system comprising:
    a reservoir within the disc drive environment, the reservoir containing the gas other than air at a reservoir pressure that is higher than a disc drive environment pressure of the disc drive environment;
    an outlet through which the gas other than air flows from the reservoir to the disc drive environment; and
    a particle trap within the disc drive environment, the particle trap trapping air particles.

2. The system of claim 1, wherein the outlet is a diaphragm through which the gas other than air diffuses into the disc drive environment.

3. The system of claim 1, further comprising:
    a pressure sensor connected to the disc drive environment, the sensor being operable to produce a pressure signal representative of the disc drive environment pressure; and
    a control module receiving the pressure signal and operably supplying the gas other than air from the reservoir to the disc drive environment if the disc drive environment pressure is within a predetermined pressure range and ceasing from supplying the gas other than air from the reservoir to the disc drive environment if the pressure within the disc drive environment is above the predetermined pressure range.

4. The system of claim 3, wherein the predetermined pressure range is about ambient atmospheric pressure.

5. The system of claim 3, wherein the predetermined pressure range is above ambient atmospheric pressure.

6. The system of claim 3, wherein the control module supplies the gas other than air from the reservoir to the disc drive environment by opening a valve that is connected to the reservoir and wherein the control module ceasing from supplying the gas other than air from the reservoir to the disc drive environment by closing the valve.

7. The system of claim 1, wherein the reservoir pressure drops from an initial pressure as the gas other than air flows from the reservoir to the disc drive environment.

8. The system of claim 7, wherein the initial pressure is from about 5 atmospheres to about 10 atmospheres.

9. The system of claim 1, wherein the particle trap confines trapped air particles to a predetermined area within the disc drive environment.

10. The system of claim 9, wherein the particle trap is a getter that chemically reacts with the trapped air particles.

11. The system of claim 10, wherein the trapped air particles are nitrogen and oxygen molecules.

12. The system of claim 1, wherein the gas other than air is helium.

13. A disc drive defining an enclosed disc drive environment containing a disc, the disc drive comprising a boosting system for boosting a concentration of a gas other than air within the disc drive environment, the boosting system comprising:
    a reservoir within the disc drive environment, the reservoir containing the gas other than air at a reservoir pressure that is higher than a disc drive environment pressure of the disc drive environment;
    a reservoir outlet through which the gas other than air flows from the reservoir to the disc drive environment; and
    a particle trap within the disc drive environment, the particle trap trapping air particles.

14. The disc drive of claim 13, wherein the reservoir pressure drops from an initial pressure as the gas other than air flows from the reservoir to the disc drive environment.

15. The disc drive of claim 14, wherein the initial pressure is from about 5 atmospheres to about 10 atmospheres.

16. The disc drive of claim 13, wherein the outlet is a diaphragm through which the gas other than air diffuses into the disc drive environment.

17. The disc drive of claim 13, further comprising:
    a pressure sensor connected to the disc drive environment, the sensor being operable to produce a pressure signal representative of the disc drive environment pressure; and
    a control module receiving the pressure signal and operably supplying the gas other than air from the reservoir to the disc drive environment if the disc drive environment pressure is within a predetermined pressure range and ceasing from supplying the gas other than air from the reservoir to the disc drive environment if the pressure within the disc drive environment is above the predetermined pressure range.

18. The disc drive of claim 17, wherein the control module supplies the gas other than air from the reservoir to the disc drive environment by opening a valve that is connected to the reservoir and wherein the control module ceasing from supplying the gas other than air from the reservoir to the disc drive environment by closing the valve.

19. The system of claim 13, wherein:
    the gas other than air is helium; and
    the particle trap confines oxygen and nitrogen particles to a predetermined area within the disc drive environment.

20. A disc drive comprising:

an enclosed disc drive environment containing a disc; and means within the disc drive environment for boosting a concentration of a gas other than air within the disc drive environment.

21. The disc drive of claim 20, wherein the means for boosting comprises:

means for supplying helium to the disc drive environment; and means for trapping air particles within the disc drive environment.

22. The disc drive of claim 21, wherein the means for supplying helium comprises:

a reservoir within the disc drive environment, the reservoir containing the gas other than air at a reservoir pressure that is higher than a disc drive environment pressure of the disc drive environment; and an outlet through which the gas other than air flows from the reservoir to the disc drive environment.

23. The disc drive of claim 21, wherein the means for trapping air particles comprises a particle trap that traps oxygen and nitrogen particles within a predetermined area of the disc drive environment.

* * * * *